Patented June 3, 1952

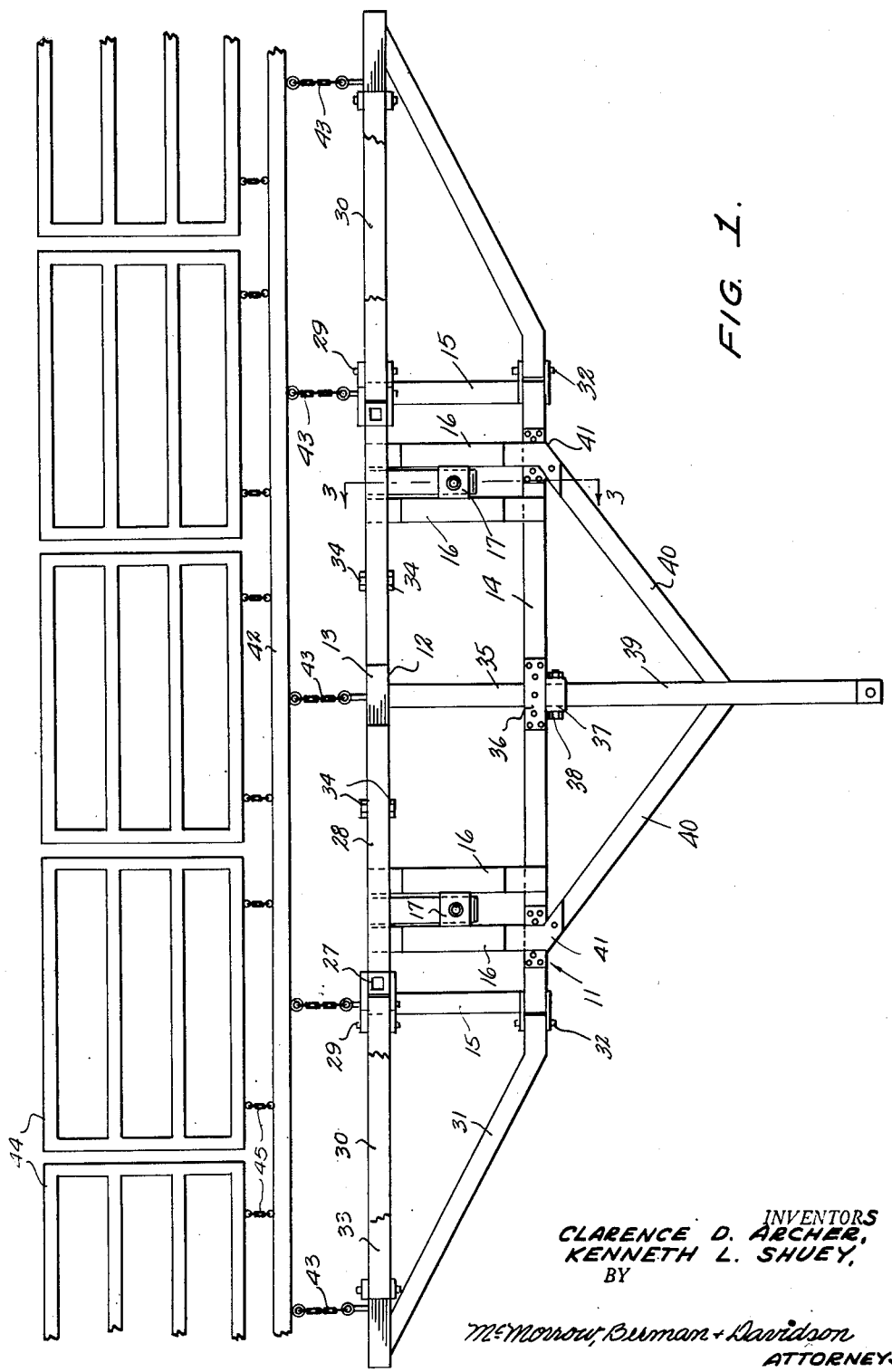
FIG. I.
INVENTORS
CLARENCE D. ARCHER,
KENNETH L. SHUEY,

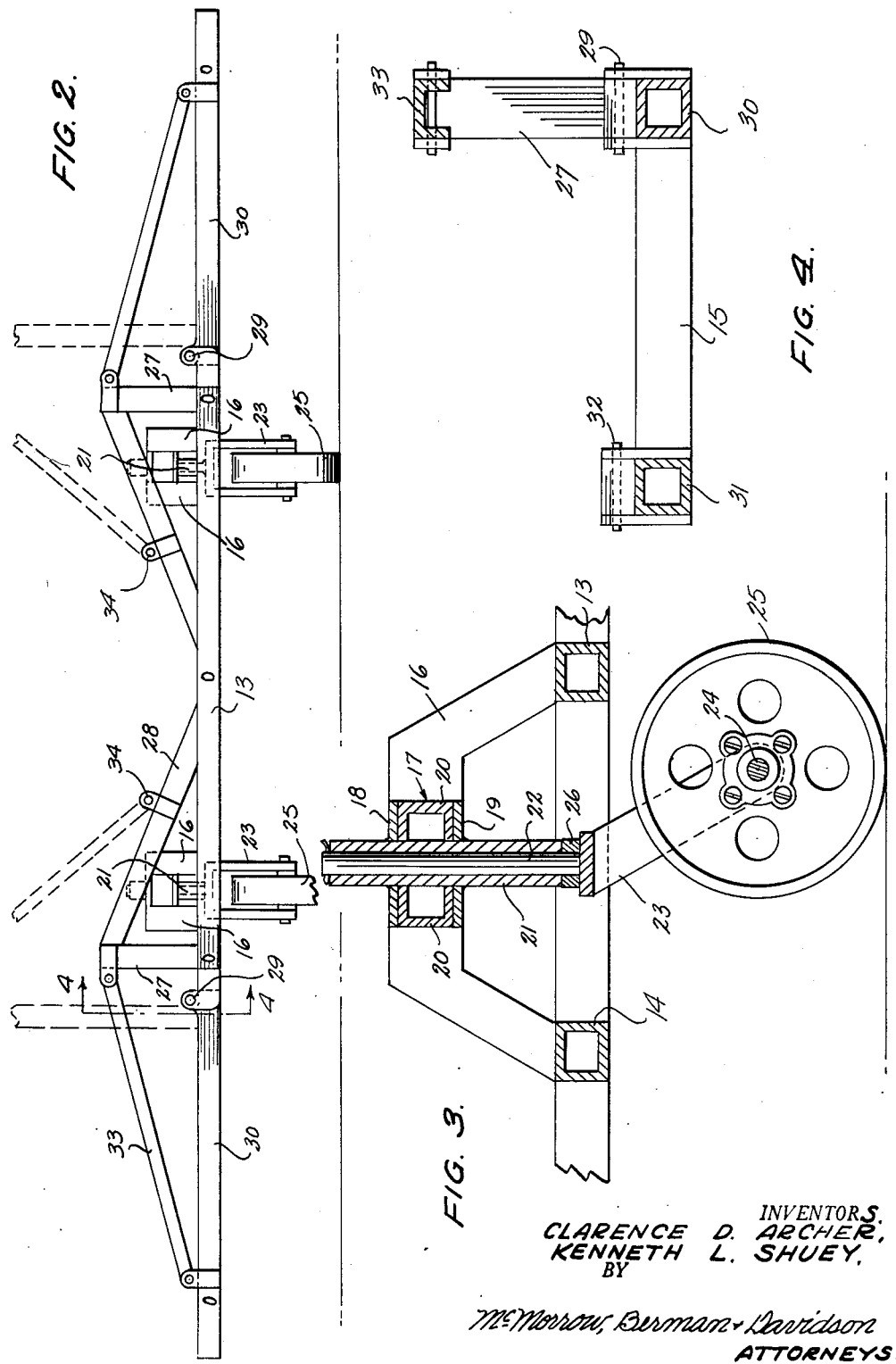

2,599,084

UNITED STATES PATENT OFFICE 2,599,084

WINGED HARROW HITCHING CART

Clarence Dee Archer and Kenneth L. Shuey,
Knights Landing, Calif.

Application August 5, 1949, Serial No. 108,804

1 Claim. (Cl. 55—93)

This invention relates to hitching devices for use with tractors, and more particularly to wheeled hitching devices for use in coupling harrows or the like to a tractor.

A main object of the invention is to provide a novel and improved harrow cart for use in coupling harrows or the like to a farm tractor, said cart being very simple in construction, easy to connect to a tractor, and allowing a large number of harrow sections to be hitched to the tractor without reduction in efficiency.

A further object of the invention is to provide an improved harrow cart for use in connecting harrow devices to a tractor, said cart being inexpensive to fabricate, sturdy in construction and providing a means for connecting a large number of harrow elements to a tractor, whereby said elements will be drawn behind the tractor and will follow the tractor in properly spaced relation not only for straight movement of the tractor, but also for turning movement thereof.

Further objects and advantages of the invention will become apparent from the following description and claim, and from the accompanying drawings, wherein:

Figure 1 is a top plan view of a harrow cart constructed in accordance with the present invention;

Figure 2 is a rear elevational view of the harrow cart of Figure 1;

Figure 3 is an enlarged cross-sectional view taken on line 3—3 of Figure 1;

Figure 4 is an enlarged cross-sectional view taken on line 4—4 of Figure 2.

Referring to the drawings, the harrow hitching cart is designated generally at 11. The cart comprises a horizontal rectangular main frame 12 comprising transverse spaced bottom bars 13 and 14 connected at their ends by short longitudinal bars 15, 15 welded or otherwise rigidly secured to the transverse bars. Rigidly secured to the transverse bars 13 and 14 adjacent the respective side bars 15, 15 are the respective pairs of spaced upwardly-arched bracket bars 16, 16 extending in vertical longitudinal planes. Rigidly connecting the intermediate top portions of the arched bracket bars 16, 16 are the respective bearing bracket assemblies 17, 17. Each bracket assembly 17 comprises top and bottom plates 18 and 19 having the respective channel elements 20, 20 therebetween, defining a hollow box structure. Extending through the plates 18 and 19 and rigidly secured thereto, as by welding, is a vertical bearing sleeve 21 which rotatably receives the vertical caster shaft 22. As shown in Figure 3, each shaft 22 has rigidly secured to its lower end a caster yoke 23 provided between the ends of its arms with a shaft 24 on which is journaled a ground-engaging caster wheel 25. A bearing washer 26 is interposed between the lower end of sleeve 21 and the top of yoke 23.

Rigidly secured to each rear corner of frame 12 and projecting vertically upwardly therefrom is a bar 27. Rigidly connecting the top of each bar 27 to the intermediate portion of rear transverse bar 13 is a downwardly and inwardly-inclined brace bar 28.

Hinged to each rear corner of frame 12 at 29 for vertical swinging movement in a transverse plane is a bar 30. Rigidly connected to the end of each bar 30 is an inclined bar 31 hinged at 32 to the adjacent forward corner of the frame 12. Connecting the top end of each vertical bar 27 to the outer portion of the adjacent wing bar 30 is a link bar 33, supporting the side wing defined by bars 30 and 31 in a horizontal position. Said side wing may be supported in a vertical inoperative position by connecting the inner ends of the link bars 33 to inner bracket lugs 34 secured on the brace bars 28 instead of to the top ends of the vertical bars 27. Figure 2 shows the side wings in inoperative positions in dotted view.

Rigidly connecting the mid-points of bars 13 and 14 is a longitudinal cross-bar 35. Secured to the mid-portion of bar 14 is a bracket 36 formed with a square, forwardly-opening sleeve portion 37. Secured in said sleeve portion 37 by a bolt 38 is the forwardly-extending tongue member 39. Integrally secured to tongue member 39 are the inclined side struts 40, 40. The ends of struts 40, 40 are bolted to respective brackets 41, 41 secured to the end portions of bar 14.

As shown in Figure 1, an elongated bar 42 is connected to the bar 13 and the wing bars 30, 30 by means of short lengths of chain, shown at 43, the bar 42 being parallel to the respective bars 13 and 30, 30. The harrow-supporting frames, shown at 44, are each connected to bar 42 by short lengths of chain 45, 45, the frames being disposed in side-by-side relationship. The frames 44 may carry the usual depending harrow elements adapted to form furrows when dragged over a plowed field.

In operation, the tongue 39 is hitched to the drawbar of a tractor. The wheels 25, 25 support the harrow hitching cart 11 for forward movement over the ground. The elongated bar 42 maintains the harrow frames 44 in properly-spaced relation not only when the tractor is moving in a straight path, but also when the tractor makes a turn. The harrow frames are supported from bar 42 in such a manner that soil cannot pile up in front of the frames, while enabling the depending harrow elements to engage the soil with full efficiency.

In the event that only a few harrow frames are employed, a shorter bar may be substituted for the bar 42 and the side wings may be folded upwardly and secured in inoperative positions, as shown in dotted view in Figure 2.

The various bar elements are preferably made of hollow box section, as by welding together channel bars. This lightens the construction of the harrow cart without appreciably reducing its durability.

While a specific embodiment of a harrow cart has been disclosed in the foregoing description, it will be understood that various modifications within the spirit of the invention will occur to those skilled in the art. Therefore, it is intended that no limitations be placed on the invention except as defined by the scope of the appended claim.

What is claimed is:

A harrow hitching cart of the character described comprising a rectangular horizontal frame, respective bearing means secured to the side portions of said frame, respective casters swiveled to said bearing means, ground-engaging wheels journaled in the respective casters, side wings hinged to the ends of the frame for upward swinging movement, detachable link bars connecting said side wings to the frame, an elongated drawbar adjacent the rear of said frame and said side wings, and a plurality of chains connecting said drawbar to the frame and said side wings in parallel relation to the frame.

CLARENCE DEE ARCHER.
KENNETH L. SHUEY.

REFERENCES CITED

The following references are of record in the file of this patent:

UNITED STATES PATENTS

| Number | Name | Date |
|---|---|---|
| 650,273 | Potter et al. | May 22, 1900 |
| 1,169,047 | McClellan | June 18, 1916 |
| 2,222,827 | Zuger | Nov. 26, 1940 |